United States Patent Office 2,953,389
Patented Sept. 20, 1960

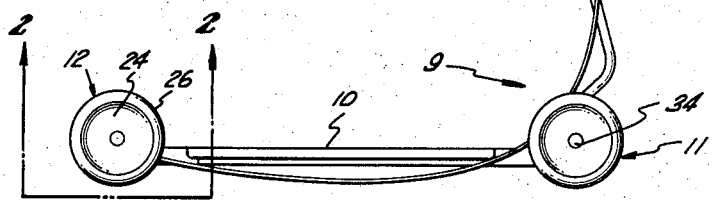
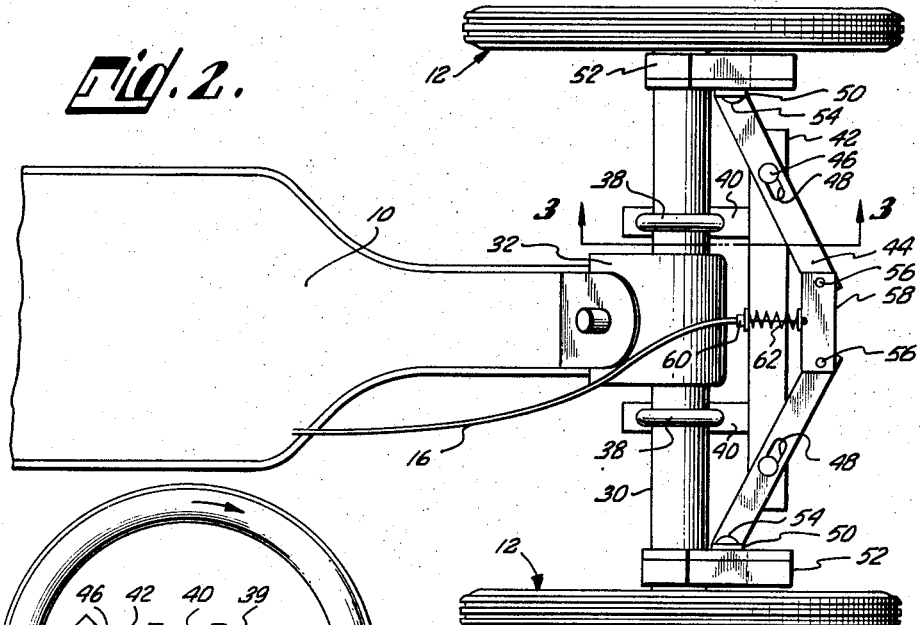
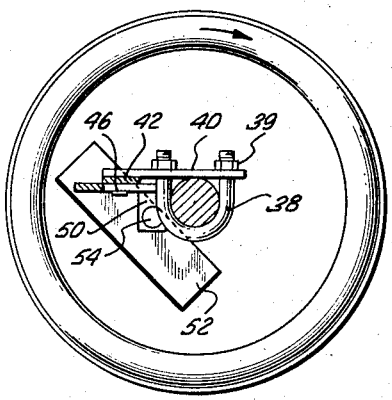

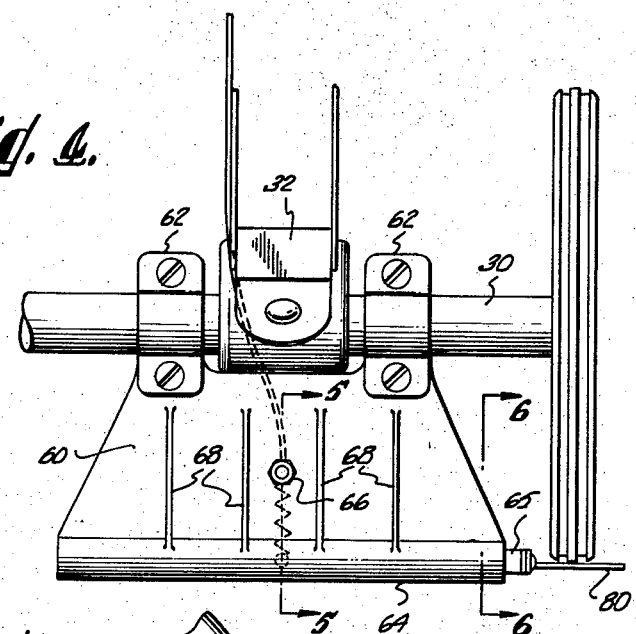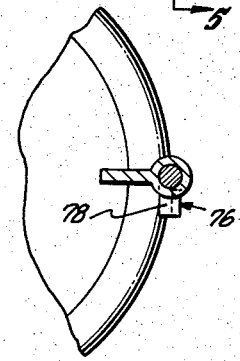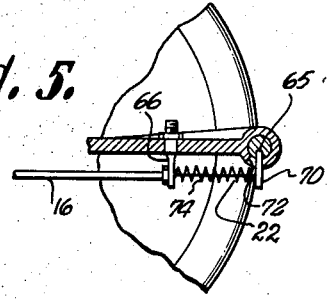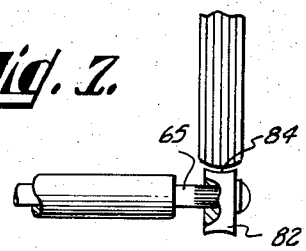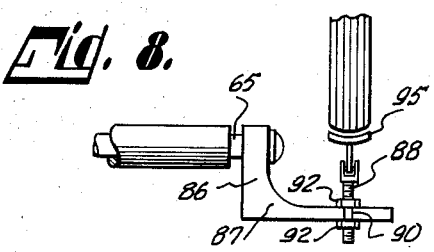

2,953,389

CHILD'S SCOOTER AND BRAKE CONSTRUCTION

Max L. Green, 1580 Corson, and William C. Kinard, 3710 Alder Lane, both of Pasadena, Calif.

Filed Nov. 10, 1958, Ser. No. 772,918

3 Claims. (Cl. 280—87.04)

This invention relates to brakes, and more particularly to brakes for children's scooters.

Most children's scooters avaible at the present time are not equipped with brakes, and consequently the scooters are stopped by children sliding their shoes on the pavement or ground. Children who ride scooters on sidewalks often wear out a pair of shoes in about a week, due primarily to scuffing and scraping their shoes on a concrete surface. This invention provides a simple, inexpensive and yet rugged brake for a child's scooter. The brake not only serves the purpose of reducing wear on children's shoes, but also provides a brake which can be actuated without the necessity of putting the propelling foot on the scooter platform. Hence, it is easy, when turning the curves and the like, to apply the brake by hand as needed.

Briefly, the invention contemplates a brake for a scooter which includes a platform, at least two rotatable wheels mounted on the platform, and an upright elongated handle mounted on the platform and guiding the scooter. The brake comprises a slidable control cable having one end mounted on the scooter handle and the other end mounted adjacent a wheel. A pivotable brake handle is mounted on the scooter handle, and one end of the control cable is connected to the brake handle so that as the brake handle is pivoted, it moves the cable longitudinally. A pivotable brake arm is secured to the scooter adjacent the wheel and the other end of the control cable adjacent the wheel is connected to the brake arm so the arm is pivoted to move toward and away from the wheel when the brake handle is pivoted to move the cable longitudinally.

Although the brake of this invention can be used on practically any type of scooter, it is ideally suited for use on the type of scooter having at least one pair of wheels connected to opposite ends of an axle which in turn is connected through an articulated joint to the platform, so that as the platform is tilted about a fore and aft and horizontal axis, the axle and wheels are forced to pivot about an upright axis causing the scooter to turn. With such scooters, the brake of this invention is arranged so that the brake arm is mounted on the axle to turn with it, the cable being sufficiently flexible to permit the axle to pivot without interfering with the operation of the brake, regardless of the degree of turn which may be imposed on the wheels.

Also in the preferred form of the invention, the brake arm includes a brake shoe which bears against the side of a wheel rim rather than against the tire mounted on the wheel, in order to reduce tire wear.

These and other aspects of the invention will be more fully understood from the following detailed description taken in conjunction with the accompanying drawings in which:

Fig. 1 is a side elevation of the brake mounted on a scooter;

Fig. 2 is a view taken on line 2—2 of Fig. 1;
Fig. 3 is a view taken on line 3—3 of Fig. 2;
Fig. 4 is a plan view of a modification of the brake of this invention;
Fig. 5 is a view taken on line 5—5 of Fig. 4;
Fig. 6 is a view taken on line 6—6 of Fig. 4;
Fig. 7 is a modification of the brake shown in Fig. 4; and
Fig. 8 is another embodiment of the brake shown in Fig. 4.

Referring to Figs. 1 and 2, a scooter 9 includes a horizontal elongated platform 10 having a forward pair of wheels 11 mounted at one end and a rear pair of wheels 12 mounted at the other end. An upright and elongated scooter handle 14 is attached at its lower end to the platform between the forward pair of wheels. An elongated guide conduit 16 is attached by a bracket 18 to the upper portion of the scooter handle. The lower end of a relatively short vertical brake handle 20 is secured by a horizontal and transverse pivot 21 to the bracket in front of the upper end of the scooter handle. A control cable 22 disposed in the guide conduit projects upwardly from the cable conduit and is attached to the lower portion of the brake handle so that as the upper portion of the brake handle is squeezed toward the scooter handle, the control cable is pulled longitudinally through the conduit. The conduit and cable extend down under the scooter platform and to the rear pair of wheels as shown most clearly in Fig. 2. Each rear wheel includes a rim 24 and a separate tire 26 secured to the periphery of each wheel rim. The rear wheels are mounted at opposite ends of a rear axle 30 which in turn is secured through a conventional articulated joint 32 to the rear of the scooter platform. The articulated joint is constructed so that as the scooter platform is tilted about its longitudinal axis, the wheels and axle are forced to turn in the direction the platform is tilted. A similar articulated joint (not shown) connects an axle 34 of the front wheels to the forward end of the platform. Since these articulated joints form no part of the invention per se, and are well known to the trade, they are not shown in detail. A pair of upwardly opening U-bolts 38 are clamped to the rear axle on opposite sides of the rear articulated joint. Each U-bolt extends up through a rearwardly extending brace 40, and a transverse cross bar 42 is welded across the rear ends of each of the braces 40. A separate brake arm 44 is secured to each end of the cross bar 42 by a vertical pin 46 disposed in a longitudinal slot 48 formed in each of the brake arms. Each brake arm extends outwardly and forwardly to terminte in a downwardly extending tab 50 (see Fig. 3) adjacent the rim of a respective wheel. A separate brake shoe 52, which is disposed between each of the tabs and a respective wheel, is secured to the tab by a rivet 54. The inner ends of the brake arms are connected by vertical pivot pins 56 to opposite ends of a horizontal and transverse toggle bar 58. The rear end of the cable conduit is attached by a fitting 60 to the center of the cross bar 42. The rear end of the control cable extends from the guide conduit through a compression spring 62 disposed between the fitting 60 and the toggle bar 58, and is attached to the central portion of the toggle bar. The toggle bar is urged by the spring in a reward direction to hold the brake shoes inwardly out of contact with the rear scooter wheels.

When the child desires to stop the scooter, he merely squeezes the brake handle to deflect it toward the scooter handle to pull the control cable longitudinally through the cable conduit and move the rear end of the cable in a forward direction and compress spring 62. The toggle bar is also pulled forward, and the brake arms are each pivoted so that their respective brake shoes are moved outwardly against a respective rim of the rear wheels, bringing the scooter to a stop without requiring the child to drag his shoe on the ground or pavement. This braking action is also achieved without requiring the child to put his propelling foot on the scooter. Moreover, the wear is taken by the brake shoe, which is inexpensive and can easily be replaced, rather than by the tire, which is more expensive and difficult to replace. The flexibility of the guide conduit and control cable permits the brake to be actuated even though the scooter is being turned.

Referring to Figs. 4 through 6, which show another embodiment of the invention, a horizontal plate 60 is secured by clamps 62 on the opposite sides of the rear articulated joint 32 on the rear axle 30 of the scooter. The plate extends to the rear of the rear axle, and the rear edge of the plate includes a transverse and horizontal tubular portion 64 in which is disposed a rotatable shaft 65. The rear end of the cable conduit is secured by a fitting 66 to the underside of the plate 60, which also includes longitudinal ribs or webs 68 to increase the strength and rigidity of the plate. The rear end of the control cable is attached to a downwardly extending pin 70 which extends up through a slot 72 formed in the lower central portion of the tubular section 64 of the plate. The pin 70 is threaded at its upper end into the rotatable shaft 65. A compression spring 74 is coaxially disposed around the rear end of the control cable and confined between the fitting 66 and the pin 70 so that the pin is urged in a rearwardly direction.

Referring to Figs. 4 and 6, the right end (as viewed in Fig. 4) of the rotatable shaft includes a crank 76 made up of a downwardly extending leg 78 attached to the shaft and an outwardly extending arm 80 attached at its inner end to the lower end of leg 78. The operation of the brake of Figs. 4 through 6 is similar to that previously described. When the brake handle is squeezed, the control cable is pulled in a forward direction, compressing spring 74. The shaft is rotated in a clockwise direction (as viewed in Figs. 5 and 6) and the arm 80 is forced to bear against the tire, bringing the scooter to a stop.

Fig. 7 shows a brake arrangement which is similar to that shown in Figs. 4 through 6, except that the crank on the end of the shaft 65 is replaced by a cam 82 disposed adjacent the tire periphery and provided with a concave surface 84 which matches that of the tire surface. When the shaft is rotated by actuating the brake as previously described, the cam is forced into contact with the tire of the wheel. Due to the concave surface of the cam, a maximum area of contact is obtained.

Fig. 8 is another modification of the device of Figs. 4 through 6, in which a crank 86 is attached to the shaft 65. An outwardly extending section 87 of the crank 86 includes a longitudinal threaded bolt 88 secured through a bore 90 in the crank by nuts 92 on opposite sides of the crank section 87. The forward end of the bolt carries a brake shoe 94 which has a concave surface matching the convex surface of the tire on the wheel. The device of Fig. 8 is operated the same way, the rotation of the shaft 65 causing the brake shoe to be forced into engagement with the wheel. The nuts 92 permit the bolt 88 to be adjusted longitudinally to take care of tire wear.

The modifications of the brake of Figs. 4 through 8 will work satisfactorily, but they are not as desirable as that of Figs. 1 and 2, because the former modifications brake against the tire wheel resulting in tire wear, instead of wear on the easily replaceable brake shoe of the latter modification.

We claim:

1. A scooter and brake combination comprising a platform, at least two rotatable wheels mounted on the platform, with one of the wheels being mounted on an axle pivotable about an upright axis and connected to the platform through an articulated joint, and an upright elongated scooter handle mounted on the platform for guiding the scooter, the brake comprising a flexible and slidable control cable having one end mounted on the scooter handle and the other end mounted adjacent the wheel on the axle, a pivotable brake handle mounted on the scooter handle, one end of the control cable being connected to the brake handle so that as the brake handle is pivoted it moves the cable longitudinally, and a pivotable brake arm secured intermediate its ends to the said axle adjacent the said wheel, the other end of the control cable being connected to the brake arm so the arm is pivoted to move toward and away from the wheel along the general direction of the longitudinal axis of the axle when the brake handle is pivoted to move the cable longitudinally.

2. A scooter and brake combination comprising a platform, at least two rotatable wheels mounted on the platform, with at least one wheel being mounted on an axle pivotable about an upright axis and connected to the platform through an articulated joint, and an upright elongated scooter handle mounted on the platform for guiding the scooter, the brake comprising a flexible guide conduit having one end mounted on the scooter handle and the other end mounted on the said axle, a flexible and slidable control cable disposed in the guide conduit, a pivotable brake handle mounted on the scooter handle, and a pivotable brake arm secured to the said axle adjacent the said wheel, one end of the control cable being connected to the brake handle so that as the brake handle is pivoted it moves the cable longitudinally in the conduit, and the other end of the control cable being connected to the brake arm so the arm is pivoted to move toward and away from the wheel in the general direction of the longitudinal axis of the axle when the brake handle is pivoted to move the cable longitudinally, the cable and conduit having sufficient slack intermediate their ends to permit the said axle to turn with respect to the scooter platform.

3. A scooter and brake combination comprising a platform, at least two rotatable wheels mounted on opposite ends of an axle connected to the platform, and an upright elongated scooter handle mounted on the platform for guiding the scooter, the brake comprising a slidable control cable having one end mounted on the scooter handle and the other end mounted adjacent a wheel, pivotable brake handle mounted on the scooter handle, and a pair of pivotable brake arms secured to the said axle, each arm extending outwardly toward a respective one of the said wheels, and being mounted to pivot and slide longitudinally about a point between its ends, the inner ends of the arms being pivotally connected together, one end of the control cable being connected to the brake handle so that as the brake handle is pivoted it moves the cable longitudinally, the other end of the control cable being connected to the inner ends of the brake arms so the arms are pivoted to move toward and away from the wheels when the brake handle is pivoted to move the cable longitudinally.

References Cited in the file of this patent

UNITED STATES PATENTS

| 414,960 | White | Nov. 12, 1889 |
| 509,122 | Faussereau | Nov. 21, 1893 |
| 807,409 | Whitaker | Dec. 12, 1905 |
| 1,138,263 | Tutt | May 5, 1915 |
| 2,443,565 | Land | June 15, 1948 |
| 2,474,946 | Kinslow | July 5, 1949 |
| 2,699,228 | Mennesson | Jan. 11, 1955 |

FOREIGN PATENTS

| 690,785 | France | June 24, 1930 |
| 491,756 | Italy | Mar. 11, 1954 |